May 5, 1942.    W. J. PODBIELNIAK    2,281,796
ART OF EFFECTING COUNTER-CURRENT CONTACT BETWEEN FLUIDS
Filed March 8, 1935    4 Sheets-Sheet 2
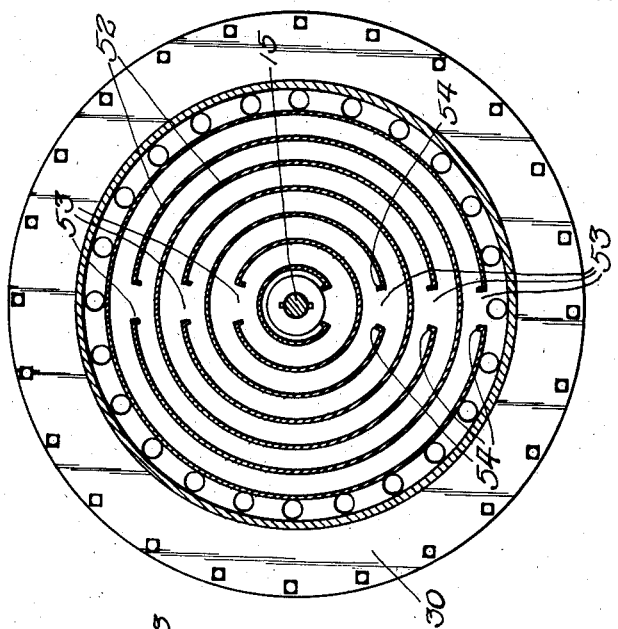
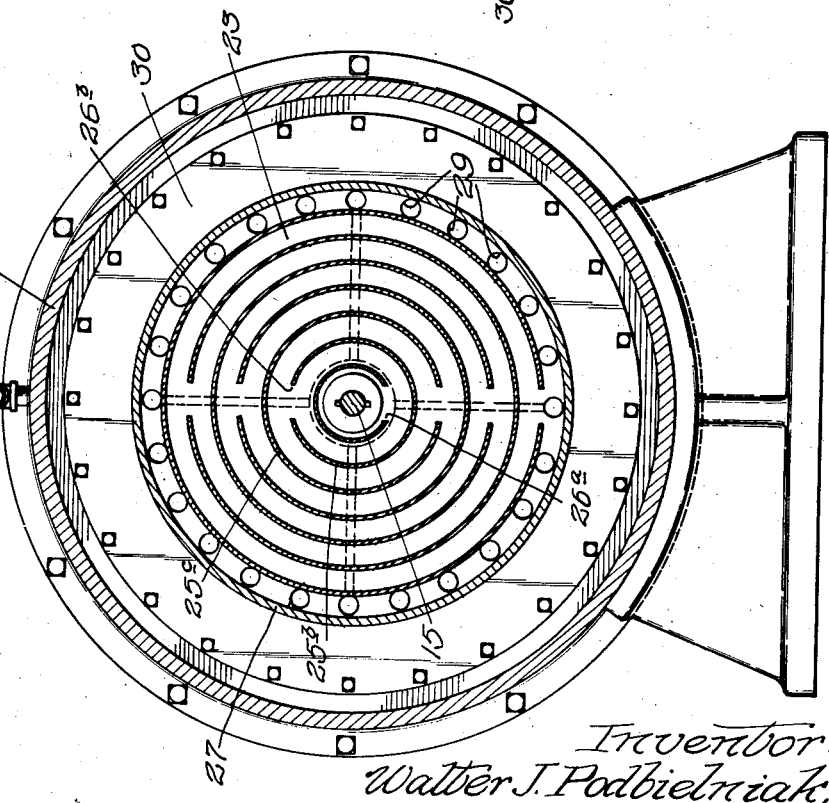
Inventor:
Walter J. Podbielniak,
By Benjamin Schneider
Atty.

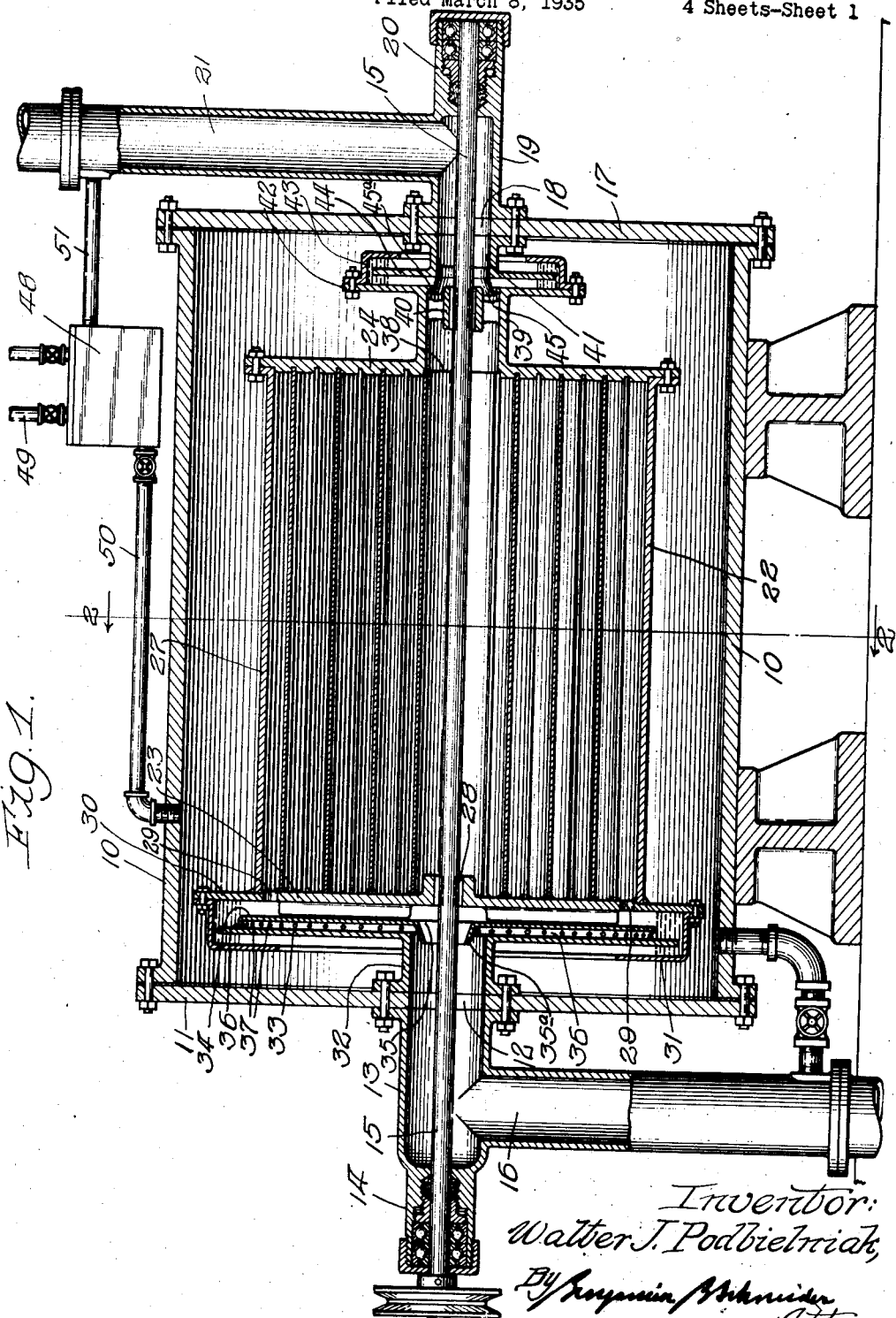

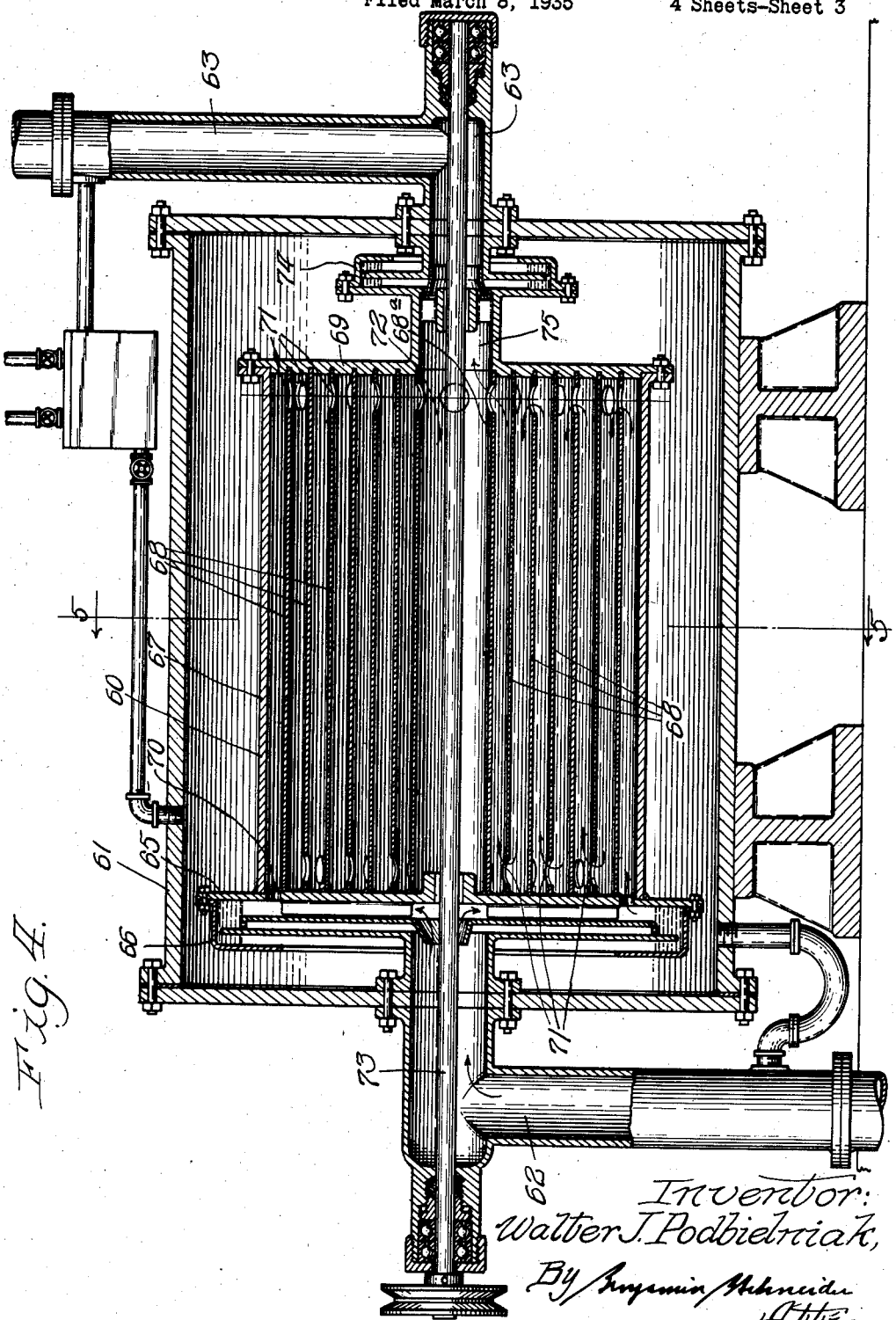

May 5, 1942.　　W. J. PODBIELNIAK　　2,281,796
ART OF EFFECTING COUNTER-CURRENT CONTACT BETWEEN FLUIDS
Filed May 8, 1935　　4 Sheets-Sheet 4

Inventor:
Walter J. Podbielniak,
By Benjamin Schneider
Atty.

Patented May 5, 1942

2,281,796

UNITED STATES PATENT OFFICE 2,281,796

ART OF EFFECTING COUNTERCURRENT CONTACT BETWEEN FLUIDS

Walter J. Podbielniak, Chicago, Ill., assignor to Benjamin B. Schneider, Chicago, Ill.

Application March 8, 1935, Serial No. 9,923

4 Claims. (Cl. 261—83)

The present invention relates to improvements in the art of effecting countercurrent contact between fluids and more particularly between liquids and vapors or gases, or between liquids of different densities that are more or less completely immiscible. It is particularly adapted for the distillation and fractionation of complex liquids, or for the fractional condensation or removal by absorption of constituents of vapor or gaseous mixtures.

The invention will be fully understood from the following description, in which:

Figure 1 is a longitudinal, vertical sectional view through apparatus suitable for carrying the invention into effect;

Fig. 2 is a transverse, vertical sectional view on the line 2—2 of Fig. 1.

Fig. 3 is a vertical, transverse sectional view through a modified form of rotor of the general type shown in Figs. 1 and 2.

Fig. 4 is a vertical longitudinal sectional view through a modified form of apparatus suitable for carrying out the invention;

Figure 6:
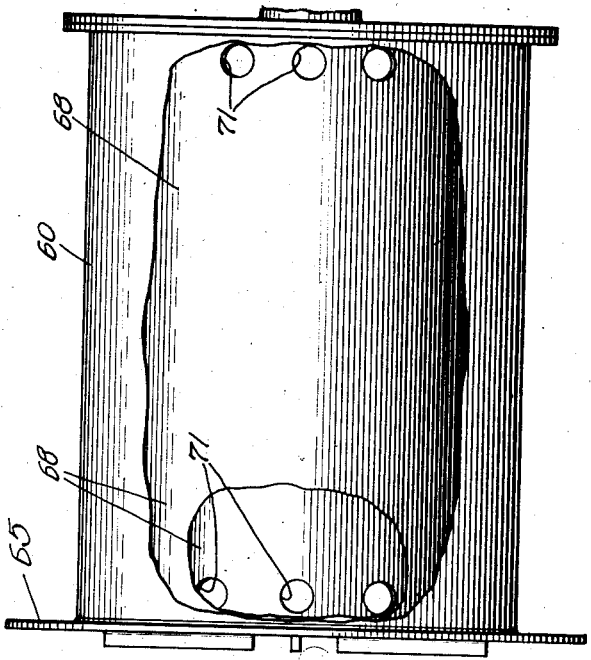
Fig. 6 is an elevation of the rotor shown in Fig. 5, partly broken away.

In order that the invention may be fully understood, it will be described in connection with a process of distillation, wherein vapors from a vaporizing receptacle containing mixed liquids are charged into the apparatus and passed countercurrent to reflux traveling through the apparatus illustrated, for the purpose of effecting fractional condensation and separation of individual constituents of the vapors. Although reference will be made in the following description to such a process, it will be understood that the present invention is not limited thereto.

Referring more particularly to Figs. 1 and 2 of the drawings, numeral 10 indicates a casing of generally cylindrical form. Casing 10 is provided at one end with a closure plate 11 provided with a central opening 12, at which there is secured to plate 11, by a fluid-tight connection, an outwardly projecting conduit section 13, provided at its end with a stuffing box 14 through which passes shaft 15 which extends through the casing 10. To the conduit section 13 there is connected a pipe or conduit 16, by which vapor from the distilling kettle or other light fluid is supplied to the apparatus.

At its opposite end, the casing 10 is closed by a plate 17, also provided approximately centrally with an opening 18, at which plate there is secured to plate 17, by a suitable fluid-tight connection, the conduit section 19 provided with a stuffing box 20. The end of the shaft 15 enters this stuffing box and is supported thereby. The conduit section 19 communicates with an exit pipe 21 for residual vapor or gas, and through which reflux liquid or other heavy liquid may be supplied, if required.

Within the casing 10, a rotor, designated as a whole by the numeral 22, is mounted upon the shaft 15. The rotor 22 is formed of an end plate 23 and an end plate 24, between which are mounted the concentric cylinders 25a, 25b, 25c, etc., these cylinders having staggered openings 26a, 26b, 26c, etc., as hereinafter described, and being surrounded by the complete cylindrical casing member 27.

It will be noted from Figure 2 that the staggered openings 26a, 26b, 26c, etc., in the cylinders 25a, 25b, 25c, extend longitudinally of the respective cylindrical partitions and that the openings in adjacent cylinders are staggered with respect to one another. In the form shown, the openings in adjacent cylinders are diametrically opposite each other.

Referring again to Figure 1, it will be noted that the end plate 23 of the rotor 22, to which the ends of the cylindrical partitions 25a, 25b, 25c, etc., and the outer cylindrical casing 27 of the rotor are secured, has a substantially gastight and liquid-tight connection with the shaft 15 at the point 28. Furthermore, the endplate 23 is provided with a number of circumferentially disposed openings 29 through which communication may be had with the outer annular space between the outermost of the cylindrical partitions 25 and the rotor casing 27. These openings likewise communicate with a device which serves as a liquid sealing device and a liquid collecting device, the construction of which is as follows.

The endplate 23, which is secured to and rotates with the shaft 15, is of generally circular form and extends somewhat beyond the rotor casing 27, the projecting annular portion being indicated at 30. To the endplate 23 there is secured the annular member 31 of generally L-shaped cross section which rotates with the endplate 23 and forms with it an annular liquid chamber. To the inner side of the endplate 11 of the casing 10, there is secured a conduit section 32, which provides an opening that communicates through the opening 12 in the endplate 11 with the opening in conduit section 13, and forms a continuation of the latter. At the end of the conduit section 32, there is provided a flat flange plate 33 forming a wide annulus, the outer edge of which is within the annular liquid chamber formed by the projecting portion 30 of the rotor endplate 23 and the annular member 31. On the annular plate 33, there is mounted a plate 34, of smaller diameter, spaced somewhat from the plate 33 and provided with a central opening 35 for the passage of the shaft 15. The opening 35 is of somewhat smaller diameter than the opening of conduit section 32, and is provided with a tapered deflector 35a. The outer edge of the plate 34 is secured to the plate 33 by a ring 36 having in it a large number of openings 37. As will be hereinafter pointed out, the assemblage of the stationary plates 33 and 34 in this manner within the annular chamber formed by the endplate 23 of the rotor and the annular member 31 provides both a sealing means and a liquid collecting means.

The endplate 24 at the opposite end of the rotor 23 likewise receives and supports the ends of the cylindrical portions 25a, 25b, 25c, etc., and the cylindrical rotor casing 27. At its centre, the end-plate 24, is provided with an opening 38, which communicates with the space in the interior of the innermost cylindrical partition 25a of the rotor 23. Extending from endplate 24 at the opening 38, there is provided the outwardly-projecting, cylindrical conduit section 39, provided internally with a spider 40, by which the endplate 24 is mounted on the shaft 15.

The conduit section 39 leading from the central portion of the rotor communicates with the stationary conduit section 41, extending inwardly from the end-plate 17 of the casing 10 at the opening 18. The conduit section 41 in turn communicates with the conduit section 19. A suitable sealing device is provided between the conduit sections 39 and 41. Such a sealing device may be formed as illustrated, the end of the rotatable conduit section 39 being provided with an outwardly projecting flange 42 forming a wide annular plate, to the outer circumference of which is secured the L-shaped annular member 43, forming with the annular plate or flange 42 an annular chamber. Into this chamber there projects the outer edge of the wide flange or annular plate 44 which is secured to or forms part of the conduit section 41. An outwardly tapering or conical deflector 45 is secured to the inner end of conduit section 41, extending to and beyond the end of conduit section 39, which may be formed with an inner lip 45a.

The operation of the device of Figs. 1 and 2 may be illustrated by way of example in connection with a distillation process.

Vapors from a distilling kettle or other device supplying vapors to be fractionated enter through the pipe 16 and the stationary conduit sections 15 and 32 surrounding the horizontal shaft 15. They pass through the opening 35 in the stationary plate 33 which forms a part of the liquid sealing and collecting device, the operation of which will be hereinafter described. Vapors then travel outwardly and enter the openings 29 in the endplate 23 of rotor 22, the latter being rotated at suitable speed to develop the centrifugal force necessary for the operation.

The vapors are supplied under such pressure as to cause them to travel inwardly through the rotor, being forced by the position of the openings 26 in concentric cylindrical members 25 to traverse the circular passages between the rings 25 and to contact with reflux liquid or other liquid, the travel of which through the device will be hereinafter set forth. When the vapors or remainder thereof reach the center of the rotor they pass out through the central opening 38 in the rotor head 24, thence through the conduit sections 41 and 19 to the exit pipe 21.

Reflux liquid for cooling purposes may be supplied to the pipe 21 in the required amounts and enters the rotor through the conduit sections 19 and 41, passing over the conical deflector 45 into the projecting portion 39 of the end-plate 24 of the rotor 22, through which it passes into the central space within the inner concentric ring 25a of the rotor. It builds up a film or layer on the inner walls of the ring 25a and as liquid is continuously supplied, it travels under the action of centrifugal force resulting from the rotation of the rotor through the opening 26a in the inner ring 25a and is projected against the inner wall of the next concentric ring 25b. Similar action takes place in this ring, the liquid traveling to the opening 26b and being there projected against the inner wall of the next concentric ring 25c. The flow of liquid continues in this manner until the outer ring or casing of the rotor 27 is reached, from which liquid discharges through the openings 29.

In its travel through the rotor, the liquid moves generally counter-current to the direction of flow of vapor and intimate contact is secured between the film and the vapor both at the surfaces of the traveling layers of liquid on the inner surfaces of the concentric rings 25 and by a spray action where the liquid is projected through the openings 26 in passing from one ring to the next.

The liquid discharged from the outer ring or casing 27 of the rotor 22 enters the rotating chamber formed by the projecting portion 30 of the end-plate 23 of the rotor and the annular member 31. The liquid accumulating in this chamber, rotating with the chamber, forms an annular liquid body (as shown at 46) into which the stationary plate 33 projects at its outer edge, thereby forming a vapor seal and preventing vapors leaving the rotor 22 at the end from which liquid is withdrawn. As liquid continues to flow into the annular chamber it reaches a point within the radius of annular plate 34 which is also a stationary plate, and thereupon liquid enters the openings 37, entering the stationary space between the plates 33 and 34. From this space it flows out through the conduit sections 32 and 13 to the pipe 16 by which it may be returned to the kettle or receptacle from which vapors are supplied to the system.

A liquid seal is likewise provided at the opposite end of the rotor, the annular chamber between the rotating flange 42 and the annular member 43 being provided with a sufficient quantity of liquid to form a layer of such depth on rotation of the rotor as to immerse the outer rim of the stationary plate 44, thereby preventing vapors from leaving the rotor and entering the chamber or casing 10.

The casing 10 may be maintained under atmospheric pressure or under any suitable pressure other than atmospheric. In order to prevent or avoid the necessity of constructing the rotor 22 to withstand undue pressures, it is desirable that the interior of the casing 10 be maintained under a pressure approximately the same as that prevailing within the interior of the rotor and, in the specific case described, within the distillation system. For this purpose, a pressure regulator and controller 48 is shown, this being of well known character and being supplied with a suitable inert gas, such as carbon dioxide, or with air or other gas if desired through the line 49, the gas thus supplied being conducted to the interior of the casing through the line 50, and the pressure within the casing being controlled by the pressure regulator 48 to correspond with that prevailing within the line 21. The pressure in the latter is communicated to the pressure regulator through the line 51.

With the construction hereinbefore described, a layer or depth of liquid builds up on the interior of the concentric rings 25 to a thickness depending upon the characteristics of the liquid and the centrifugal force developed in the operation. While this centrifugal force may be approximately equal to the force exerted by gravity or even less, it is preferred that it be substantially in excess of the force of gravity and preferably at least twice. In general, I have found it advisable to employ conditions of operation, rates of rotation and the like so that the centrifugal force effective in the operation is equivalent to five or more times the force of gravity. A speed of rotation of 600 to 2000 R. P. M. or higher has been found suitable.

In case it is desired that the thickness of the film or liquid upon the inner surfaces of the concentric rings 25 be increased, a modified form of construction of the rings within the rotor may be employed, as shown in Figure 3. In this form of construction, of which only the rotor is shown in a view corresponding to that of Figure 2, the concentric rings of the rotor herein designated by number 52 are each provided adjacent the openings 53 with the inwardly projecting lips 54. The height of these lips then determines the depth of liquid retained upon the inner surfaces of the concentric rings and increases it to the desired extent greater than the depth retained in the form of construction shown in Figures 1 and 2.

In the forms of construction of the apparatus in accordance with the present invention hereinbefore described, the traverse of the liquid within the concentric passages provided within the rotor under the action of centrifugal force is in general circumferential or transversely of the passages. In the form of construction shown in Figs. 4 and 5, the paths of the liquids and of the vapors through the rotor are in general longitudinally of the cylindrical passages provided in the rotor.

Figure 5:
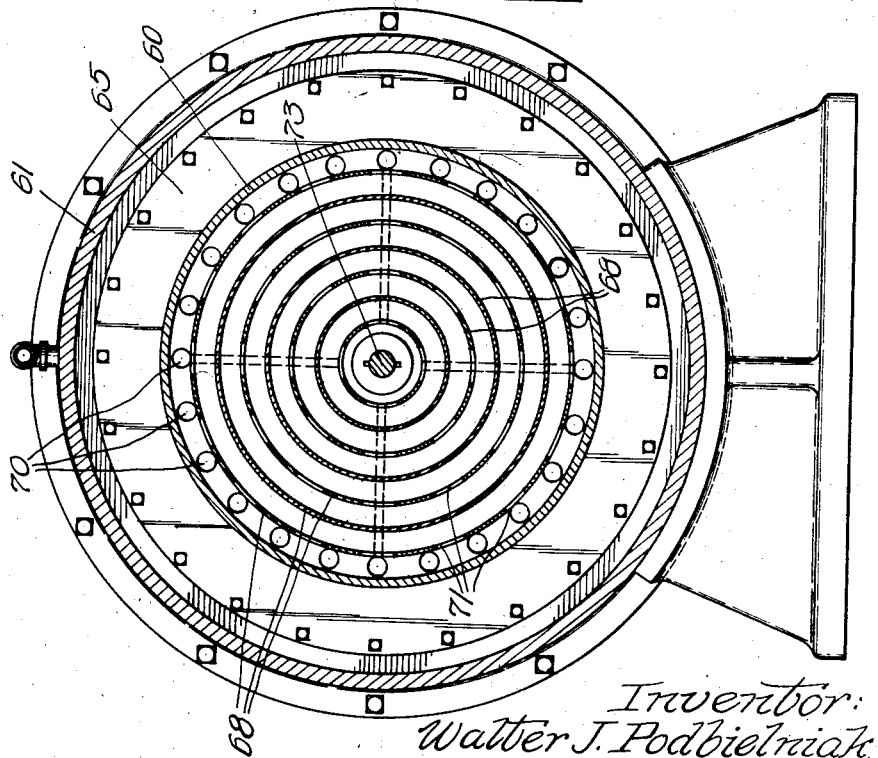
Fig. 5 is a vertical transverse sectional view on the broken line 5—5 of Fig. 4.

In the form of construction shown in Figs. 4, 5 and 6, the construction of the parts other than the rotor is essentially the same as is shown in Figs. 1 and 2. In Figs. 4, 5 and 6, the rotor 60 is mounted in the casing 61 and inlet connections 62 and outlet connections 63 are provided into and out of the rotor respectively and are similar in form and construction to the inlet and outlet connections illustrated in Figure 1. The rotor 60 is provided at one end with a head 64 having a projecting flange 65 on which is mounted a liquid sealing and collecting device 66, also similar to that illustrated in connection with the rotor of Figure 1. The rotor 60 has an external closed cylindrical casing 67 and is provided internally with a plurality of cylindrical partitions 68 secured respectively to the endplates 64 and 69 of the rotor 60. The endplate 64 is provided with the inlet opening 70 which leads into the outermost cylindrical passage formed between the partition 68n and the outer casing 67 of the rotor 60. The cylindrical passages between the partitions 68 communicate with each other by openings 71 which, in alternate partitions, are at opposite ends of the rotor. The innermost partition 68a communicates with the central passage 72 of the rotor, within which is located the shaft 73 upon which the rotor is mounted. The manner of mounting the rotor upon this shaft is the same as in the form illustrated in Figure 1. Similarly, the seal 74 and outlet connections 63 from the rotor and casing 61 are provided as in Figure 1. In the form of construction shown in Figs. 4, 5 and 6, it will be seen that the movement of the gases and the liquid through the rotor under the action of centrifugal force developed by the rotation of the rotor is longitudinally of the cylindrical passages between the partitions 68. An extended path of contact is thus provided between the gas or vapor and the liquid and in addition, at the openings in the partitions through which the liquid and vapors pass, a spray contact between the liquid and vapors is secured. The conditions of operation are generally similar to those described in connection with the form illustrated in Figs. 1 and 2.

The devices shown in the drawings are generally horizontally disposed, the rotors being mounted upon horizontal axes. As is readily apparent, they may be mounted on vertical axes, since the main force compelling the movement of the liquid through the system is centrifugal force and static pressure is employed to force the vapors through the system. If desired, particularly when the rotor is mounted vertically, and when the travel of the liquid is from end to end longitudinally of the cylindrical passages as in the form shown in Figs. 4, 5 and 6, the partitions may be given a slight conical pitch toward the openings between passages, alternate partitions being pitched or coned in opposite directions. In general, however, such conformation of the partitions is not necessary and the desired counter-current flow is secured with cylindrical partitions both with horizontally and vertically mounted rotors.

While the invention has been described hereinbefore in connection with distillation operations, it is readily apparent that it is also applicable to other operations in which counter-current contact between vapors and liquids are desired; for example, in absorption processes for removing constituents from natural gas or other gases, by absorption in oil or other liquids in processes wherein constituents of gases are removed by chemical action, as in the removal of hydrogen sulphide from gases by contact with alkali solutions, such as solutions of soda ash, triethanolamine and the like. The invention may also be employed in processes where counter-current contact between liquids of different densities, which are more or less completely immiscible with one another is desired; for example, in solvent processes for removing constituents of lubricating oils and the like, the chemical refining of hydrocarbon oils with sulphuric acid, alkalis or the like, suitable means being provided in such cases for the introduction of the heavier and lighter liquids into the rotor.

Although the present invention has been described in connection with details of specific apparatus and processes for carrying the same into effect, it is to be understood that these are not to be regarded as limitations upon the scope of the invention, except insofar as included in the accompanying claims.

I claim:

1. In apparatus for effecting counter-current contact between fluids, a rotor comprising passages of increasing radii communicating with each other, an outer casing with which the outermost of said passages communicates, means for supplying a liquid within said rotor, means for rotating said rotor to cause said liquid to pass outwardly through said passages, means for discharging liquid from said rotor comprising an annular chamber mounted on said rotor and communicating with the interior of the rotor, whereby liquid or heavy fluid leaving the rotor is collected within said annular chamber, and a stationary collector chamber extending into said annular chamber and provided with one or more openings through which liquid collected in said annular chamber may enter said stationary collector chamber.

2. In apparatus for effecting counter-current contact between fluids, a rotor comprising passages of increasing radii communicating with each other, an outer casing with which the outermost of said passages communicates, means for supplying a liquid within said rotor, means for rotating said rotor to cause said liquid to pass outwardly through said passages, and means for discharging liquid from said rotor comprising an annular chamber mounted to rotate with said rotor and communicating with the interior of the rotor, whereby liquid leaving the rotor is collected within said annular chamber, and a stationary collector chamber extending into said annular chamber provided with one or more openings through which liquid collected in said annular chamber may enter said stationary collector chamber, said collector chamber having a projecting annular ring entering the liquid in said annular chamber, thereby providing a liquid seal.

3. In apparatus for effecting counter-current contact between fluids, a rotor and means for effecting rotation thereof, means for supplying a liquid to an inner portion of said rotor and a lighter fluid to an outer portion thereof, and passages within said rotor through which said liquid passes outwardly on rotation of the rotor, an annular chamber rotatable with said rotor and communicating therewith at a point to receive liquid discharged from said rotor, a stationary collector chamber extending into said annular chamber and provided with one or more openings through which the liquid collected in said annular chamber may enter said stationary collector chamber, and means for withdrawing fluid from the stationary collector chamber.

4. In apparatus for handling fluids, a rotor and means for effecting rotation thereof, means for supplying liquid to the interior of said rotor, said means including a conduit having a portion rotatable with the rotor and a stationary conduit portion, an annular chamber formed at the end of said rotating conduit portion and adapted to contain an annular body of liquid on rotation of the rotor and rotating conduit portion, an outwardly projecting stationary flange formed on said stationary conduit section, said flange extending into the annular chamber formed on the rotating conduit portion and adapted to enter the annular body of liquid formed on rotation of the latter, thereby forming a liquid seal, and a stationary deflector member extending from the end of the stationary conduit section into the rotating conduit section.

WALTER J. PODBIELNIAK.